(12) United States Patent
Eby et al.

(10) Patent No.: US 12,002,035 B2
(45) Date of Patent: Jun. 4, 2024

(54) METAVERSE AUTHENTICATION

(71) Applicant: American Express Travel Related Services Company, Inc., New York, NY (US)

(72) Inventors: Alaric M. Eby, Phoenix, AZ (US); Andras L Ferenczi, Peoria, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 149 days.

(21) Appl. No.: 17/657,331

(22) Filed: Mar. 30, 2022

(65) Prior Publication Data
US 2023/0316263 A1  Oct. 5, 2023

(51) Int. Cl.
G06Q 20/36 (2012.01)
G06Q 20/06 (2012.01)
H04L 9/08 (2006.01)
H04L 9/32 (2006.01)

(52) U.S. Cl.
CPC ....... *G06Q 20/3674* (2013.01); *G06Q 20/065* (2013.01); *H04L 9/0825* (2013.01); *H04L 9/3247* (2013.01)

(58) Field of Classification Search
CPC ............ G06Q 20/3674; G06Q 20/065; H04L 9/0825; H04L 9/3247; H04L 9/3213; H04L 9/3271; H04L 9/50

USPC .......................................................... 705/67
See application file for complete search history.

(56) References Cited

U.S. PATENT DOCUMENTS

2023/0135947 A1* 5/2023 Barhudarian ............. H04L 9/50
726/26
2023/0274283 A1* 8/2023 Kryvoshei ................ H04L 9/50
705/44

FOREIGN PATENT DOCUMENTS

JP         7180933 B1 * 11/2022
KR     2023030863 A  *  3/2023
KR     2023139003 A  * 10/2023

* cited by examiner

*Primary Examiner* — Zeshan Qayyum
(74) *Attorney, Agent, or Firm* — Thomas | Horstemeyer, LLP (57) ABSTRACT

Disclosed are various embodiments for metaverse authentication using NFTs. An authentication setup request for an NFT can be received from an owner of the NFT. Then, a unique authentication credential for the NFT can be requested from an NFT smart contract. In response, URL of an edge wallet associated with an owner of the unique authentication credential is received. Then, a request can be sent to the URI of the edge wallet for the unique authentication credential. In response, a signed challenge is received from the edge wallet and a public key is retrieved from the NFT. A signature of the signed challenge is determined to be valid based at least in part on the public key, and access to an asset or resource is configured based at least in part on the signature of the signed challenge being valid.

20 Claims, 5 Drawing Sheets

METAVERSE AUTHENTICATION

BACKGROUND

A metaverse allows user to interact with each other in a virtual world, often in the form of avatars. These avatars are digital or virtual representations of a user, through which a user could interact with other users' avatars or with virtual objects or assets in the virtual world. However, digital authentication in the metaverse is often unable to rely upon uniquely identifying features of users. For example, individuals have unique fingerprints, iris coloration patterns, facial features, etc. that allow for the identity of individuals to be verified. For example, fingerprint readers can permit or deny access to doors, laptops, etc. by verifying a user's identity through biometrics. In contrast, digital avatars in a virtual world do not inherently have any uniquely identifying features that could be used for authentication.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for providing authentication in a metaverse. This can include, for example, using non-fungible tokens (NFTs) for the purpose of authentication to receive access to resources in the metaverse. In these situations, an NFT could be used to represent a unique authentication credential for an individual, such as the virtual equivalent of an avatar's biometric information (e.g., an iris scan, fingerprint, voice print, etc. of an avatar in a virtual world). As avatars in a virtual world lack actual irises, fingerprints, voiceprints, etc., unique authentication credentials could be implemented and/or represented using cryptographic primitives. Moreover, the NFT could be transferred from one owner to another, such as when a user sells his or her avatar to another user or if a user wishes to transfer access granted by the NFT from one user to another.

A metaverse can represent a virtual world that allows for interactions with virtual objects or other individuals. In some implementations, multiple virtual worlds can be connected together to form a larger virtual world for the metaverse. Examples of metaverses include virtual world platforms, such as SECOND LIFE, and massively multi-player online role-playing games (MMORPGs) such as WORLD OF WARCRAFT. However, the principles of the various embodiments of the present disclosure could be adapted to any virtual world or metaverse.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
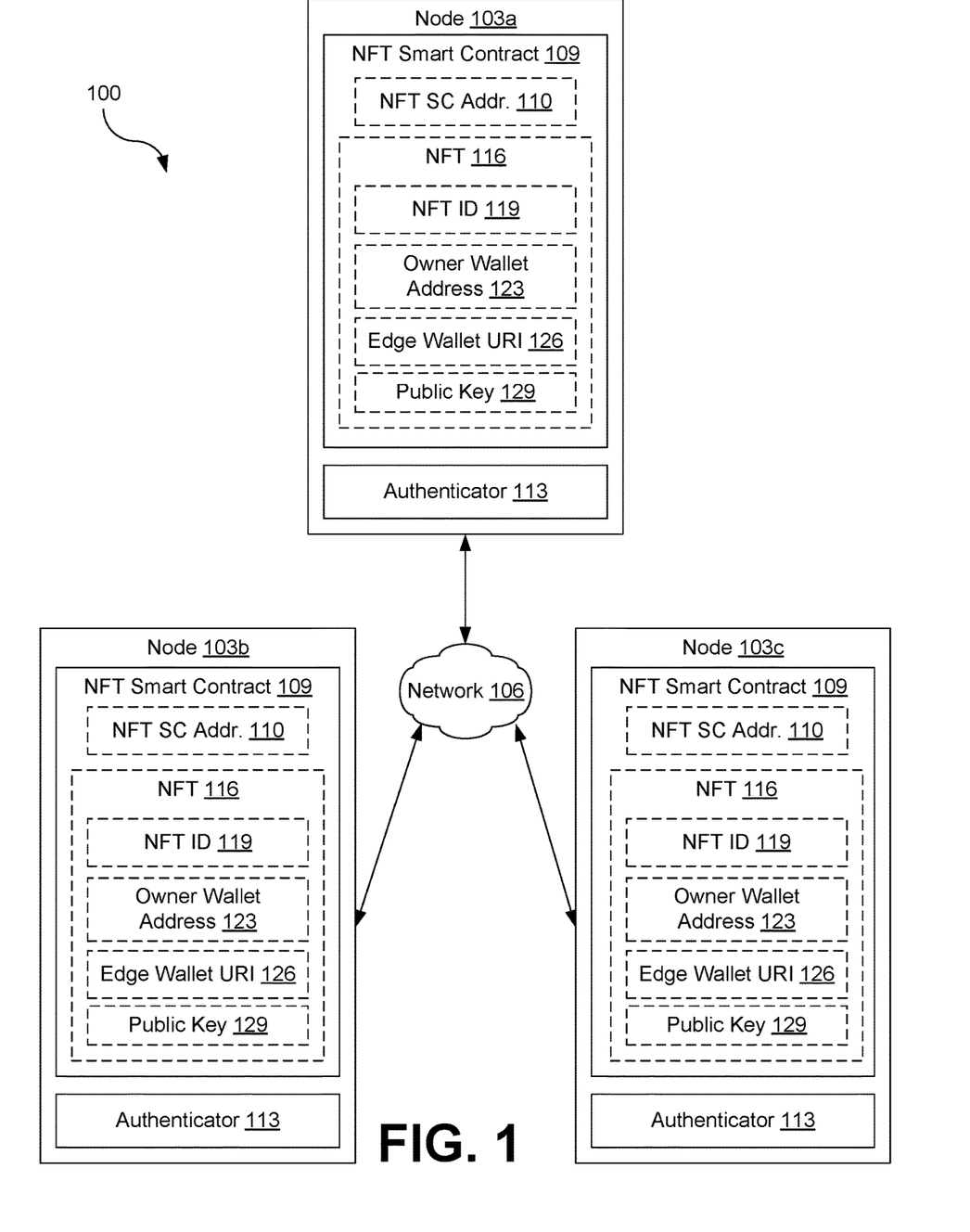
FIG. 1 is a drawing of a blockchain network according to various embodiments of the present disclosure.

FIG. 1 illustrates a blockchain network 100 according to various embodiments of the present disclosure. The blockchain network 100 represents a plurality of nodes 103 (e.g., nodes 103a, 103b, 103c, etc.), which can be in data connection with other through a network 106. Each node 103 can represent one or more computing devices the provide storage and/or computational resources to the blockchain network 100. The nodes 103 can communicate with each other using a peer-to-peer networking protocol to implement an immutable, append only, eventually consistent distributed data store formed from a plurality of nodes in a peer-to-peer network that maintain duplicate copies of data stored in the blockchain 109. The nodes 103 of the blockchain network 100 can use a variety of consensus protocols to coordinate the writing of data written to the blockchain network 100. Examples of blockchain networks 100 include the BITCOIN network, the ETHEREUM network, the SOLANA network, etc.

Various smart contracts could be stored on the blockchain network 100. A smart contract can represent executable computer code that can be executed by a node 103 of the blockchain network 100. In many implementations, the smart contract can expose one or more functions that can be called by any user or a by limited/predefined set of users. To execute one or more functions of a smart contract, an application can submit a request to a node 103 of the blockchain network 100 to execute the function. The node 103 can then execute the function and store the result to the blockchain network 100. Nodes 103 may charge fees in the form of cryptocurrency coins or tokens to execute a function and store the output, with more complicated or extensive functions requiring larger fees. An example of this implementation is the ETHEREUM blockchain, where users can pay fees, referred to as "gas," in order to have a node of the ETHEREUM blockchain execute the function and store the result to the ETHEREUM blockchain. Additionally, the more "gas" a user pays, the more quickly the function will be executed and its results committed to the blockchain network 100.

The NFT smart contract 109 can represent a smart contract stored on the blockchain network 100 to create, manage, and/or maintain non-fungible tokens 116. The NFT smart contract 109 can also include an NFT smart contract address 110, which can uniquely identify the NFT smart contract 109 with respect to other NFT smart contracts 109 on the blockchain network 100. The functions provided by the NFT smart contract 109 could be executed to allow users to mint or create non-fungible tokens (NFTs) 116. Once minted, other functions provided by the NFT smart contract 109 could be executed to transfer ownership of the NFT 116, update data stored with or associated with the NFT 116, and/or perform other functions related to the NFT 116. In some implementations, the NFT smart contract 109 may be compliant with standardized interface or protocol, such as the ERC-721 standard or the ERC-1155 standard.

Figure 2:
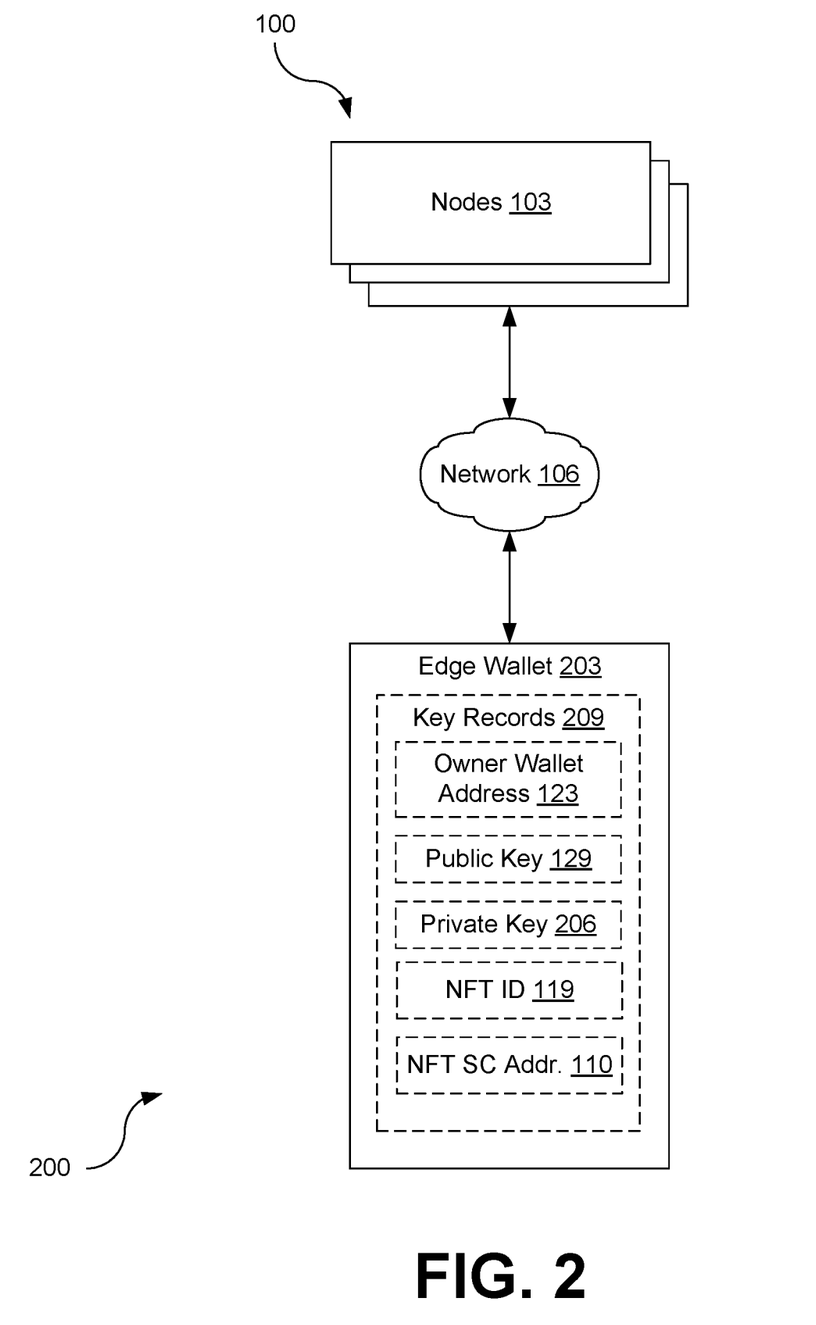
FIG. 2 is a drawing of a network environment according to various embodiments of the present disclosure.

An NFT 116 can include various types of information. For example, an NFT 116 could include an NFT identifier 119, an owner wallet address 123, an edge wallet uniform resource indicator (URI) 126, and a public key 129. In some implementations, the edge wallet URI 126 and the public key 129 could be stored in a JavaScript Object Notation (JSON) file along with other implementation specific metadata. The NFT identifier 119 can be any identifier that uniquely identifies the NFT 116 with respect to other NFTs 116 created or maintained by the NFT smart contract 109. The owner wallet address 123 represents the blockchain network 100 wallet address of the owner of the NFT 116. The edge wallet URI 126 represents a URI that identifies an edge wallet 203 (FIG. 2) used by or associated with the owner of the NFT 116. The public key 129 represents a public key generated by or issued to the owner of the NFT 116 for a respective private key 206 (FIG. 2). In some implementations, the public key 129 could represent a public key 129 that is compliant with the Boneh-Lynn-Shacham (BLS) cryptographic signature system.

The authenticator 113 represents an application (such as a smart contract hosted by and executed on the blockchain network 100) that can configure NFTS 116 for use as authentication, authenticate access to services or resources using an NFT 116, and coordinate the transfer of an NFT 116 from one user to another. Although the authenticator 113 is depicted as a smart contract executed by the nodes 103 of the blockchain network 100, the authenticator 113 could also be executed or implemented as a separate application hosted on a computing device that is not a participant in the blockchain network 100, but is in data communication with the blockchain network 100 (including the nodes 103 of the blockchain network 109) through the network 106.

The network 106 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 106 can also include a combination of two or more networks 106. Examples of networks 106 can include the Internet, intranets, extranets, virtual private networks (VPNs), and similar networks.

With reference to FIG. 2, shown is a network environment 200 according to various embodiments. The network environment 200 can include the blockchain network 100 (including the nodes 103) and one or more edge wallets 203 in data communication with the blockchain network 100 via the network 106.

The edge wallet 203 can represent any service that can hold or store sensitive or private date on behalf of a user of the blockchain network 100. For example, the edge wallet 203 could securely store sensitive or private information linked to the owner wallet address 123 of a user. A user could retrieve the sensitive or private information by submitting a request signed by the respective private key for the user's owner wallet address 123. After verifying the signature, the edge wallet 203 could return the sensitive or confidential information to the user or send the sensitive or confidential information to a third-party designated by the user (e.g., a third-party specified in the request signed by the user).

One example of a sensitive or confidential data store in the edge wallet 203 in various embodiments of the present disclosure is a key record 209. The key record 209 can include information such as the owner wallet address 123 of the user who is associated with the key record 209. The key record 209 could also include a public key 129 and a respective private key 206 that could be used as unique authentication credentials in the various embodiments of the present disclosure. In some instances, the NFT identifier 119 and the NFT smart contract address 110 for a particular NFT 116 could be stored in a key record 209. This could allow for users to use multiple NFTs 116 for authentication purposes (e.g., one NFT 116 to represent an Iris scan of an avatar in a virtual world, a second NFT 116 to represent a fingerprint of an avatar in a virtual world, etc.).

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the edge wallet 203 could be executed or hosted in a computing environment, which can employ a plurality of computing devices that can be arranged in one or more server banks or computer banks or other arrangements. Such computing devices can be located in a single installation or can be distributed among many different geographical locations. For example, the computing environment can include a plurality of computing devices that together can include a hosted computing resource, a grid computing resource or any other distributed computing arrangement. In some cases, the computing environment can correspond to an elastic computing resource where the allotted capacity of processing, network, storage, or other computing-related resources can vary over time.

Figure 3:
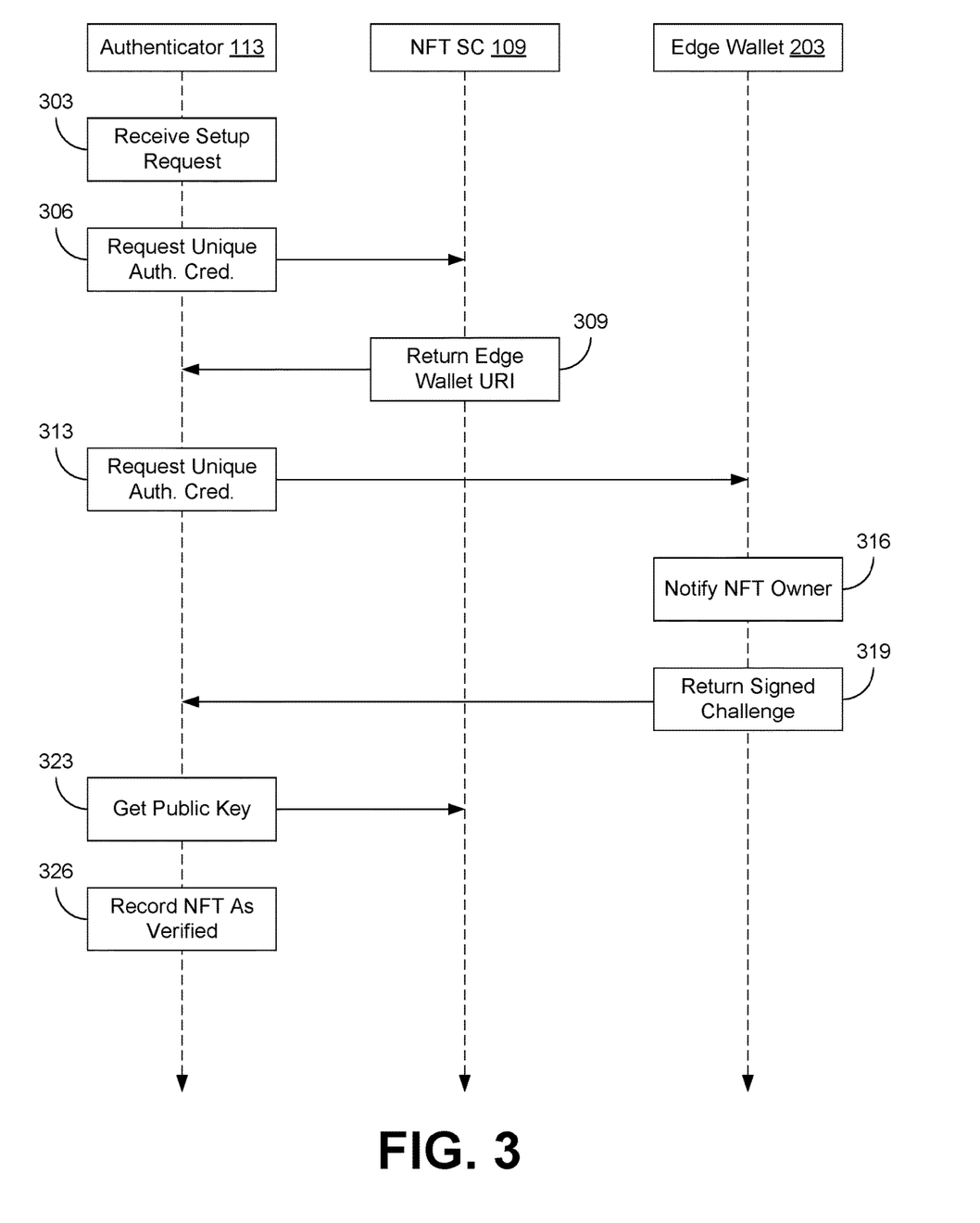
FIG. 3 is a sequence diagram illustrating one example of functionality implemented as portions of an application executed in a computing environment in the network environment of FIG. 2 according to various embodiments of the present disclosure.

Referring next to FIG. 3, shown is a sequence diagram that provides one example of the interactions between an authenticator 113, NFT smart contract 109, and an edge wallet 203 for configuring an NFT 116 for use in authenticating a user. The sequence diagram of FIG. 3 provides merely an example of the many different types of interactions between the authenticator 113, NFT smart contract 109, and the edge wallet 203. As an alternative, the sequence diagram of FIG. 3 can be viewed as depicting an example of elements of a method implemented within the network environment 200.

Beginning with block 303, the authenticator 113 can receive a request to setup an NFT 116 for use in authentication situations. In some instances, the request could be received from the owner of the NFT 116 (e.g., using a wallet client on a client device of the owner). In other instances, the request could be received from the NFT smart contract 109 (e.g., in response to or as a portion of the creation of the NFT 116). The request can include the owner wallet address 123 of the owner of the NFT 116 and the NFT identifier 119 that identifies the NFT 116.

Then, at block 306, the authenticator 113 can request a unique authentication credential associated with the NFT 116. For example, the authenticator 113 can invoke an API function call provided by the NFT smart contract 109 to request the unique authentication credential. The authenticator 113 could pass the owner wallet address 123 and NFT identifier 119 as arguments to the function of the NFT smart contract 109 in order to specify with particularity the NFT 116 being configured and, therefore, the unique authentication credential to be used.

Subsequently, at block 309, the NFT smart contract 109 can return the edge wallet URI 126 of the edge wallet 203 associated with the owner of the NFT 116. In some instances, the edge wallet URI 126 returned could include the owner wallet address 123, which would allow the authenticator 113 to directly request the unique authentication credential from the edge wallet 203

Next, at block 313, the authenticator 113 can request the unique authentication credential associated with the NFT 116 from the edge wallet 203. For example, the authenticator could send a request to the edge wallet URI 126 received at block 309. The request could include information such as the purpose of the request (to configure an NFT 116 for authentication purposes) and the identity of the requestor (e.g., the identity of the authenticator 113). In some instances, this information could be embedded in the URI.

Moving on to block 316, the edge wallet 203 can notify the owner of the NFT 116 to confirm that the unique authentication credential should be provided in response to the request from the authenticator 113. For example, the edge wallet 203 could send a request to a client device or address of the user that was registered with the edge wallet 203. The request could specify the purpose of the request, the information requested, the identity of the requester, etc. If the owner of the NFT 116 approves of the request, then the process proceeds to block 319.

Proceeding to block 319, the edge wallet 203 can then return a signed challenge to the authenticator 113. For example, the edge wallet 203 could return the public key 129, and the public key 129 could be signed by the private key 206 to prove that the owner of the NFT 116 is in control of the private key 206 for the respective public key 129.

Then, at block 323, the authenticator 113 can then retrieve the public key 129 from the NFT 116. For example, the authenticator 113 could invoke a function call provided by the NFT smart contract 109 that returns the public key 129. The arguments for the function could include the NFT identifier 119 and potentially other data.

Finally, at block 326, the authenticator 113 can record that the NFT 116 can be used to authenticate the owner as identified by the owner wallet address 123. This could be done in response to two conditions. First, it could be done in response to validating the signature of the signed challenge received at block 319 using the public key 129 retrieve at block 323. Second, it could be done in response to determining that the signed public key 129 received at block 319 matches the public key 129 retrieved at block 323. If both conditions are true, then the authenticator 113 can record that the NFT 116 can be used by its owner, as defined by the owner wallet address 123, for authentication purposes.

Figure 4:
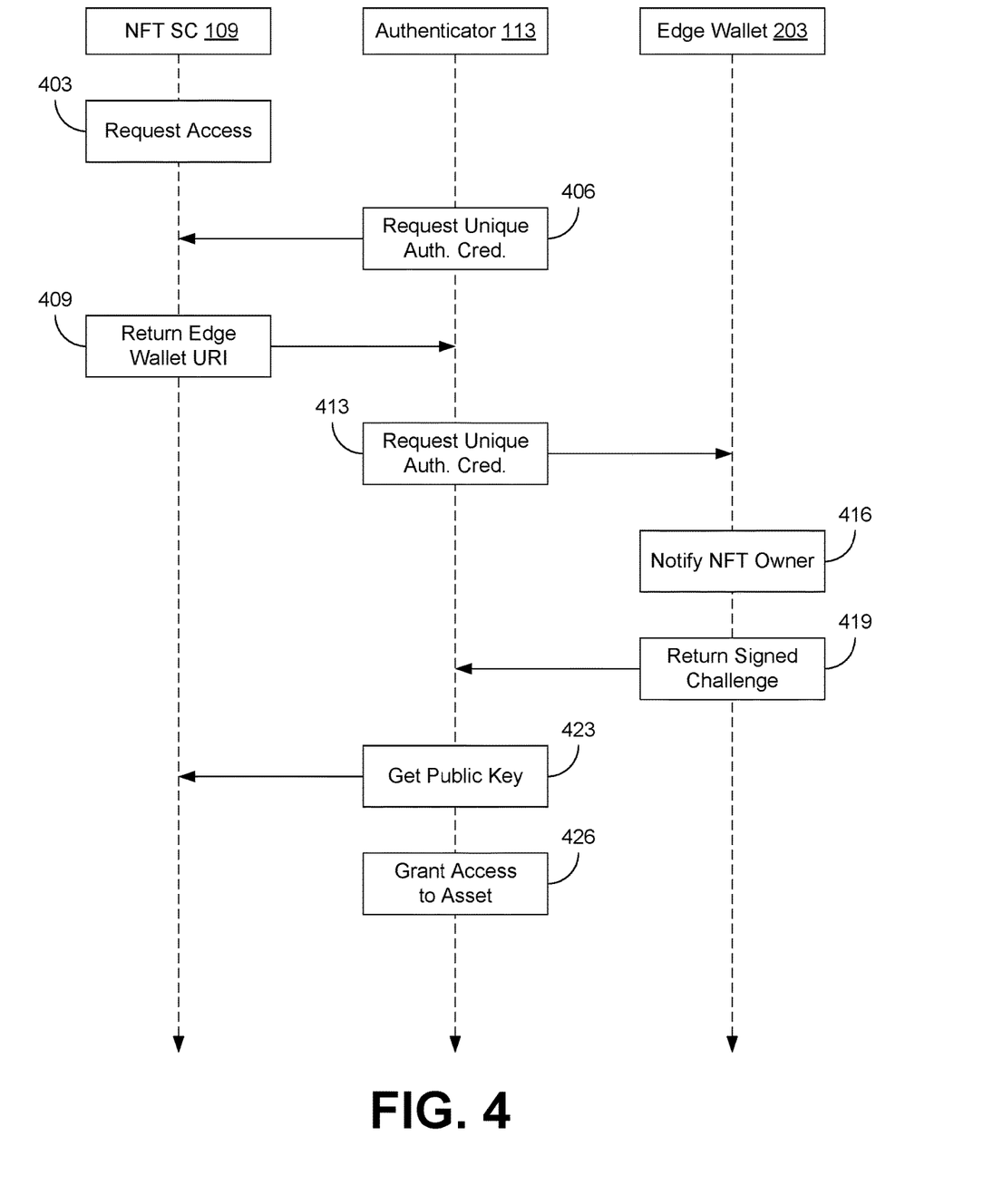
FIG. 4 is a sequence diagram illustrating one example of functionality implemented as portions of an application executed in a computing environment in the network environment of FIG. 1 according to various embodiments of the present disclosure.

Referring next to FIG. 4, shown is a sequence diagram that provides one example of the interactions between an authenticator 113, NFT smart contract 109, and an edge wallet 203 for authenticating a user with an NFT 116. The sequence diagram of FIG. 4 provides merely an example of the many different types of interactions between the authenticator 113, NFT smart contract 109, and the edge wallet 203. As an alternative, the sequence diagram of FIG. 4 can be viewed as depicting an example of elements of a method implemented within the network environment 200.

Beginning with block 403, the NFT smart contract 109 can forward an access request to the authenticator 113. This could be done, for example, in response to the NFT smart contract 109 receiving a request to authenticate a user to provide him or her with access to an item or asset (e.g., in a metaverse). The request to authenticate the user can include the NFT identifier 119 of the NFT 116, the owner wallet address 123 of the NFT 116, and/or potentially other information.

In response, at block 406, the authenticator 113 can request a unique authentication credential associated with the NFT 116. For example, the authenticator 113 can invoke an API function call provided by the NFT smart contract 109 to request the unique authentication credential. The authenticator 113 could pass the owner wallet address 123 and NFT identifier 119 as arguments to the function of the NFT smart contract 109 in order to specify with particularity the NFT 116 being configured and, therefore, the unique authentication credential to be used.

Accordingly, at block 409, the NFT smart contract 109 can return the edge wallet URI 126 of the edge wallet 203 associated with the owner of the NFT 116. In some instances, the edge wallet URI 126 returned could include the owner wallet address 123, which would allow the authenticator 113 to directly request the unique authentication credential from the edge wallet 203

Then, at block 413, the authenticator 113 can request the unique authentication credential associated with the NFT 116 from the edge wallet 203. For example, the authenticator could send a request to the edge wallet URI 126 receive at block 309. The request could include information such as the purpose of the request (to configure an NFT 116 for authentication purposes) and the identity of the requestor (e.g., the identity of the authenticator 113). In some instances, this information could be embedded in the URI.

Next, at block 416, the edge wallet 203 can notify the owner of the NFT 116 to confirm that the unique authentication credential should be provided in response to the request from the authenticator 113. For example, the edge wallet 203 could send a request to a client device or address of the user that was registered with the edge wallet 203. The request could specify the purpose of the request, the information requested, the identity of the requester, etc. If the owner of the NFT 116 approves of the request, then the process proceeds to block 419.

Proceeding to block 419, the edge wallet 203 can then return a signed challenge to the authenticator 113. For example, the edge wallet 203 could return the public key 129, and the public key 129 could be signed by the private key 206 to prove that the owner of the NFT 116 is in control of the private key 206 for the respective public key 129.

Moving to block 423, the authenticator 113 can then retrieve the public key 129 from the NFT 116. For example, the authenticator 113 could invoke a function call provided by the NFT smart contract 109 that returns the public key 129. The arguments for the function could include the NFT identifier 119 and potentially other data.

Finally, at block 426, the authenticator 113 can indicate to the NFT smart contract 109 that access to the asset can be granted. This could be done in response to two conditions. First, it could be done in response to validating the signature of the signed challenge received at block 419 using the public key 129 retrieve at block 423. Second, it could be done in response to determining that the signed public key 129 received at block 419 matches the public key 129 retrieved at block 423. If both conditions are true, then the authenticator 113 can determine that the NFT 116 can be used for authenticating its owner, as defined by the owner wallet address 123, and that authentication has been approved or authorized by the owner at block 416.

Figure 5:
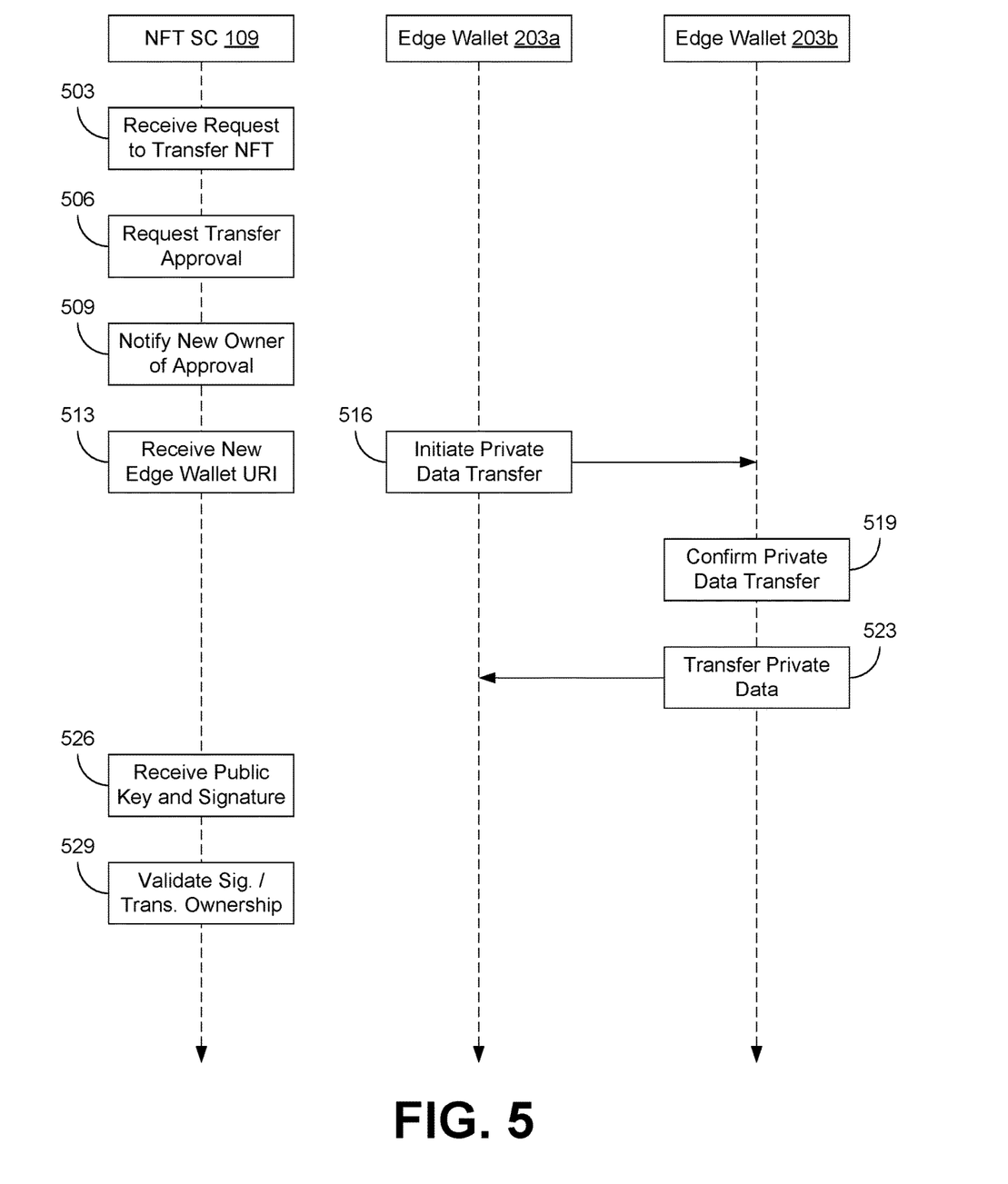
FIG. 5 is a sequence diagram illustrating one example of functionality implemented as portions of an application executed in a computing environment in the network environment of FIG. 1 according to various embodiments of the present disclosure.

Referring next to FIG. 5, shown is a sequence diagram that provides one example of the interactions between NFT smart contract 109, a first edge wallet 203*a*, and a second edge wallet 203*b* to transfer an NFT 116 from a current owner to a new owner. The sequence diagram of FIG. 5 provides merely an example of the many different types of interactions between the NFT smart contract 109, the first edge wallet 203*a*, and the second edge wallet 203*b*. As an alternative, the sequence diagram of FIG. 5 can be viewed as depicting an example of elements of a method implemented within the network environment 200.

Beginning with block 503, the NFT smart contract 109 can receive a request to transfer an NFT 116 from a current owner to a new owner. The request could, for example, be received from the new owner of the NFT 116. In such a situation, the request could specify the owner wallet address 123 of the new owner. The request could also include cryptocurrency coins or tokens (e.g., as payment to the existing owner for the NFT 116).

Then, at block 506, the NFT smart contract 109 can notify the existing owner of the request to transfer ownership of the NFT 116. For example, the NFT smart contract 109 could send a request to a client device or address of the user that was registered with NFT smart contract 109 or to the owner wallet address 123 of the owner (e.g., for display by a user wallet client). The request could specify the purpose of the request, the information requested, the identity of the requester, etc. If the owner of the NFT 116 approves of the request, then the process proceeds to block 509. If the owner fails to accept the request, or fails to accept the request within a predefined number of blocks being added to the blockchain network 100, the NFT smart contract 109 could return the cryptocurrency coins or tokens to the purchaser.

Moving on to block 509, the NFT smart contract 109 can send a notification to the new owner of the approval of the transfer of the NFT 116. For example, the NFT smart contract 109 could send a message to a client device or address of the new owner of the NFT 116.

Next, at block 513, the NFT smart contract 109 can receive from the new owner the edge wallet URI 126*a* of the edge wallet 203*a* used by or associated with the new owner.

Meanwhile, at block 516, the edge wallet 203*a* can initiate a transfer of private data associated with the NFT 116 in response to receiving a message from the new owner (e.g., from the client device or wallet client of the new owner) to transfer the private data associated with the NFT 116 from the existing owner to the new owner. The data to be transferred could include, for example, a key record 209 associated with the owner wallet address 123 to represent a unique authentication credential. Accordingly, the message from the new owner could specify the owner wallet address 123 identifying the existing owner, the NFT identifier 119 of the NFT to be transferred, and the NFT smart contract address 110 of the respective NFT smart contract 109. The message could also include the edge wallet URI 126*b* of the edge wallet 203*b*, which could have been retrieved from the NFT 116 by the new owner. The edge wallet 203*a* could send a request to an edge wallet 203*b* to initiate the transfer, and the request could include some or all of the data included in the message received from the new owner.

Referring next to block 519, the edge wallet 203*b* can confirm the transfer of the private data with the existing owner. For example, the edge wallet 203*b* could send a request to a client device or address of the user that was registered with the edge wallet 203*b*. The request could specify the purpose of the request, the information requested, the identity of the requester, etc. If the current owner of the NFT 116 approves of the request, then the process proceeds to block 523.

Then, at block 523, the edge wallet 203*b* can securely transfer the requested private data, such as a key record 209 to the edge wallet 203*a* of the new owner of the NFT 116. For example, the edge wallets 203*a* and 203*b* could use a challenge-response protocol to verify their identities to each other. They could then perform a Diffie-Hellman key exchange to establish an encryption key to protect the contents of the data to be transferred. The key record 209 could then be provided by the edge wallet 203*b* of the existing owner to the edge wallet 203*a* of the new owner.

Subsequently, at block 526, the NFT smart contract 109 can receive a public key 129 of the new owner and a signature for the respective private key.

Subsequently, at block 529, the NFT smart contract 109 can validate the signature of the public key 129 (e.g., a BLS signature). If the signature is valid, the NFT smart contract 109 can transfer ownership of the NFT 116 to the new owner. This could include updating the owner wallet address 123, edge wallet URI 126, and/or the public key 129 stored in the NFT 116 to reflect the owner wallet address 123, edge wallet URI 126, and/or public key 129 of the new owner. The NFT 116 could then be used by the new owner for authentication purposes.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g. storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:
1. A system, comprising:
   a computing device comprising a processor and a memory; and
   machine-readable instructions stored in the memory that, when executed by the processor, cause the computing device to at least:
      receive an authentication request for a non-fungible token (NFT) from an NFT smart contract;
      request a unique authentication credential for the NFT from the NFT smart contract;
      receive a uniform resource identifier (URI) of an edge wallet associated with an owner of the unique authentication credential from the NFT smart contract;

send a request to the URI of the edge wallet for the unique authentication credential;
receive a signed challenge from the edge wallet;
retrieve a public key from the NFT;
determine that a signature of the signed challenge is valid based at least in part on the public key; and
grant access to an asset or resource based at least in part on the signature of the signed challenge being valid.

2. The system of claim 1, wherein the signed challenge comprises the public key and the machine-readable instructions, when further executed, cause the computing device to at least:
determine that the public key of the signed challenge matches the public key from the NFT; and
access is granted to the NFT in response to the public key of the signed challenge matching the public key retrieved from the NFT.

3. The system of claim 1, wherein the public key complies with the Boneh-Lynn-Shacham (BLS) signature scheme.

4. The system of claim 1, wherein the authentication request is received from a client application executing on a client device that is attempting to access the asset.

5. The system of claim 1, wherein the signed challenge is received from the edge wallet in response to the edge wallet receiving approval of the owner of the NFT.

6. The system of claim 1, wherein the edge wallet represents a service that can hold or store sensitive or private date on behalf of a user of a blockchain network.

7. The system of claim 1, wherein the machine-readable instructions are a component of a smart contract stored on a blockchain network.

8. A method, comprising:
receiving an authentication setup request for a non-fungible token (NFT) from an NFT smart contract;
requesting a unique authentication credential for the NFT from the NFT smart contract;
receiving a uniform resource identifier (URI) of an edge wallet associated with an owner of the unique authentication credential from the NFT smart contract;
sending a request to the URI of the edge wallet for the unique authentication credential;
receiving a signed challenge from the edge wallet;
retrieving a public key from the NFT;
determining that a signature of the signed challenge is valid based at least in part on the public key; and
configuring access to an asset or resource based at least in part on the signature of the signed challenge being valid.

9. The method of claim 8, wherein the signed challenge comprises the public key and the method further comprises:
determine that the public key of the signed challenge matches the public key from the NFT; and
access is limited to the asset in response to the public key of the signed challenge matching the public key retrieved from the NFT.

10. The method of claim 8, wherein granting access to the asset further comprises recording that the NFT can be used to authenticate the owner.

11. The method of claim 8, wherein the signed challenge is received from the edge wallet in response to the edge wallet receiving approval of the owner of the NFT.

12. The method of claim 8, wherein the edge wallet represents a service that can hold or store sensitive or private date on behalf of a user of a blockchain network.

13. The method of claim 8, wherein the method is performed with a smart contract stored on a blockchain network.

14. The method of claim 8, wherein the public key complies with the Boneh-Lynn-Shacham (BLS) signature scheme.

15. A system, comprising:
a computing device comprising a processor and a memory; and
machine-readable instructions stored in the memory that, when executed by the processor, cause the computing device to at least:
receive an authentication setup request for a non-fungible token (NFT) from an NFT smart contract;
request a unique authentication credential for the NFT from the NFT smart contract;
receive a uniform resource identifier (URI) of an edge wallet associated with an owner of the unique authentication credential from the NFT smart contract;
send a request to the URI of the edge wallet for the unique authentication credential;
receive a signed challenge from the edge wallet;
retrieve a public key from the NFT;
determine that a signature of the signed challenge is valid based at least in part on the public key; and
configure access to an asset or resource based at least in part on the signature of the signed challenge being valid.

16. The system of claim 15, wherein the signed challenge comprises the public key and the machine-readable instructions, when executed, further cause the computing device to at least:
determine that the public key of the signed challenge matches the public key from the NFT; and
access is limited to the asset in response to the public key of the signed challenge matching the public key retrieved from the NFT.

17. The system of claim 15, wherein the machine-readable instructions that cause the computing device to grant access to the asset further cause the computing device to record that the NFT can be used to authenticate the owner of the NFT.

18. The system of claim 15, wherein the signed challenge is received from the edge wallet in response to the edge wallet receiving approval of the owner of the NFT.

19. The system of claim 15, wherein the edge wallet represents a service that can hold or store sensitive or private date on behalf of a user of a blockchain network.

20. The system of claim 15, wherein the public key complies with the Boneh-Lynn-Shacham (BLS) signature scheme.

* * * * *